United States Patent
Herman et al.

(10) Patent No.: US 11,879,295 B2
(45) Date of Patent: Jan. 23, 2024

(54) GOUGING CUTTER DRILL BIT

(71) Applicant: Shear Bits, Inc., Spring, TX (US)

(72) Inventors: John James Herman, Cypress County (CA); Carl M. Hoffmaster, Houston, TX (US)

(73) Assignee: Shear Bits, Inc., Spring, TX (US)

( * ) Notice: Subject to any disclaimer, the term of this patent is extended or adjusted under 35 U.S.C. 154(b) by 0 days.

(21) Appl. No.: 17/370,952

(22) Filed: Jul. 8, 2021

(65) Prior Publication Data

US 2021/0332646 A1   Oct. 28, 2021

Related U.S. Application Data

(63) Continuation of application No. PCT/US2020/013040, filed on Jan. 10, 2020.

(60) Provisional application No. 62/791,141, filed on Jan. 11, 2019.

(51) Int. Cl.
*E21B 10/43* (2006.01)
*B23B 27/14* (2006.01)
*E21B 10/62* (2006.01)

(52) U.S. Cl.
CPC .............. *E21B 10/43* (2013.01); *B23B 27/14* (2013.01); *E21B 10/62* (2013.01); *B23B 2222/92* (2013.01); *B23B 2226/315* (2013.01)

(58) Field of Classification Search
CPC .......... E21B 10/28; E21B 10/55; E21B 10/56; E21B 10/5673; E21B 10/627; E21B 10/633; E21B 10/43; B23B 27/14
See application file for complete search history.

(56) References Cited

U.S. PATENT DOCUMENTS

| | | | |
|---|---|---|---|
| 4,986,375 A * | 1/1991 | Maher | E21B 10/003 |
| | | | 175/401 |
| 6,029,759 A | 2/2000 | Sue et al. | |
| 8,505,634 B2 | 8/2013 | Lyons et al. | |
| 10,107,041 B2 | 10/2018 | Herman et al. | |
| 2009/0218140 A1 | 9/2009 | Pessier et al. | |
| 2010/0059288 A1* | 3/2010 | Hall | E21B 10/55 |
| | | | 175/430 |
| 2011/0155472 A1 | 6/2011 | Lyons et al. | |
| 2011/0162893 A1 | 7/2011 | Zhang | |
| 2013/0313021 A1 | 11/2013 | Zahradnik et al. | |
| 2014/0262536 A1* | 9/2014 | Azar | E21B 10/265 |
| | | | 175/335 |
| 2015/0060149 A1* | 3/2015 | Herman | E21B 10/43 |
| | | | 175/374 |
| 2016/0084010 A1* | 3/2016 | Beaton | E21B 10/633 |
| | | | 175/432 |

(Continued)

OTHER PUBLICATIONS

International Search Report and Written Opinion, International Application No. PCT/US2020/013040 dated Apr. 20, 2020.

(Continued)

*Primary Examiner* — Cathleen R Hutchins
(74) *Attorney, Agent, or Firm* — Richard A. Fagin

(57) ABSTRACT

A drill bit includes a bit body; a plurality of gouging cutters rotatably mounted to the bit body so as to define a first profile; and a plurality of gouging cutters non-rotatably mounted to the bit body so as to define a second profile. The first profile is longitudinally ahead of the second profile in a direction of drilling of the drill bit by a selected distance.

29 Claims, 6 Drawing Sheets

(56) References Cited

U.S. PATENT DOCUMENTS

2018/0067325 A1    3/2018  Yonekubo et al.
2021/0372203 A1*  12/2021  Eyre .................. E21B 10/5735

OTHER PUBLICATIONS

Canadian Office Action dated Sep. 21, 2022, for Canadian Application No. 3,125,170.
Office Action dated Apr. 20, 2023, for Colombian Patent Application No. NC2021/0009023.
Office Action dated Aug. 15, 2023, for Canadian Patent Application No. 3,125,170.
Office Action dated Oct. 23, 2023, for Colombian Patent Application No. NC2021/0009023.

* cited by examiner

GOUGING CUTTER DRILL BIT

CROSS REFERENCE TO RELATED APPLICATIONS

Continuation of International Application No. PCT/US2020/013040 filed on Jan. 10, 2020. Priority is claimed from U.S. Provisional Application No. 62/791,141 filed on Jan. 11, 2019. Both the foregoing applications are incorporated herein by reference in their entirety,

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

The present disclosure relates to the field of fixed cutter drill bits used for drilling subsurface wells, tunnels and passageways. More specifically, the present disclosure relates to fixed cutter drill bits using claw or gouging type cutters.

Drill bits used to drill shallow oil and gas wells, such as those having target depths of up to about 700 meters true vertical depth, river crossings and similar passageways (horizontal directional drilling—HDD), and mine shaft drilling are known to use pick cutter or gouging cutter drill bits. Such bits are known in the art as "claw" bits, one example of which is sold under the trademark QUI-KLAW, which is a trademark of Drillhead, Inc., 408 Temple Brown Rd., Roseburg, Oregon 97470. Such bits are known to be useful in drilling clay, unconsolidated sand, loose rock and gravel.

U.S. Pat. No. 8,505,634 issued to Lyons et al. describes a drill bit having gouging cutting elements (gouging cutters) disposed adjacent to shearing cutting elements (shear cutters) on a blade formed on the bit body. The shearing cutting elements have a planar cutting face, while the gouging cutting elements have a non-planar cutting face, e.g., dome shaped, bullet (ballistic) shaped or cone shaped. Such drill bits are known to be used in drilling in some shallow, coarse grained formations that may be associated with bedrock depth changing throughout a geologic field, wherein gravel seams may exist from surface to as deep as 350 meters true vertical depth. In drilling such formations, drilling fluid flow rates may range from 700-1000 liters per minute. Low drilling flow rates can result in bit balling, nozzle plugging, poor hole cleaning and mud ring development, all resulting in well (hole) problems and/or low drilling rate performance. Poor solids control may result in wash of plenum, erosion around shear (e.g., polycrystalline diamond compact or PDC) cutters which may limit the number of bit runs before having to send the drill bit for repair or to replace the drill bit. During back reaming out of a well, fill and gravel sloughing is possible. Small drilling rigs used in such drilling operations require smooth and low reactive torque exerted by the drill bit. Combined shear and gouging cutter bits may be too aggressive and torque fluctuations may be excessive for their use under such conditions. Damage and/or wear may occur as a result of gravel, sand abrasion or erosion. In such formations, bit performance of both PDC or roller cone tooth bits may decrease, resulting in poor drill rate, poor directional control or unacceptable deviation.

There is a need for improved drill bits that can drill reliably and inexpensively in shallow, coarse grained formations that may be associated with bedrock depth changing throughout a geologic field.

SUMMARY

A drill bit according to one aspect of the present disclosure includes a bit body; a plurality of gouging cutters rotatably mounted to the bit body so as to define a first profile; and a plurality of gouging cutters non-rotatably mounted to the bit body so as to define a second profile. The first profile is longitudinally ahead of the second profile in a direction of drilling of the drill bit by a selected distance.

In some embodiments, the selected distance is constant.

Some embodiments further comprise a plurality of gage inserts coupled to the bit body on gage surfaces defined by the bit body.

In some embodiments, the bit body comprises steel.

In some embodiments, the plurality of rotatably mounted gouging cutters comprises metal carbide cutters.

In some embodiments, the metal carbide comprises tungsten carbide.

In some embodiments, the plurality of non-rotatably mounted gouging cutters comprises metal carbide cutters.

In some embodiments, the plurality of rotatably mounted gouging cutters comprises polycrystalline diamond.

In some embodiments, the plurality of non-rotatably mounted gouging cutters comprises polycrystalline diamond.

Other aspects and advantages will be apparent from the description and claims that follow.

DETAILED DESCRIPTION

Figure 1:
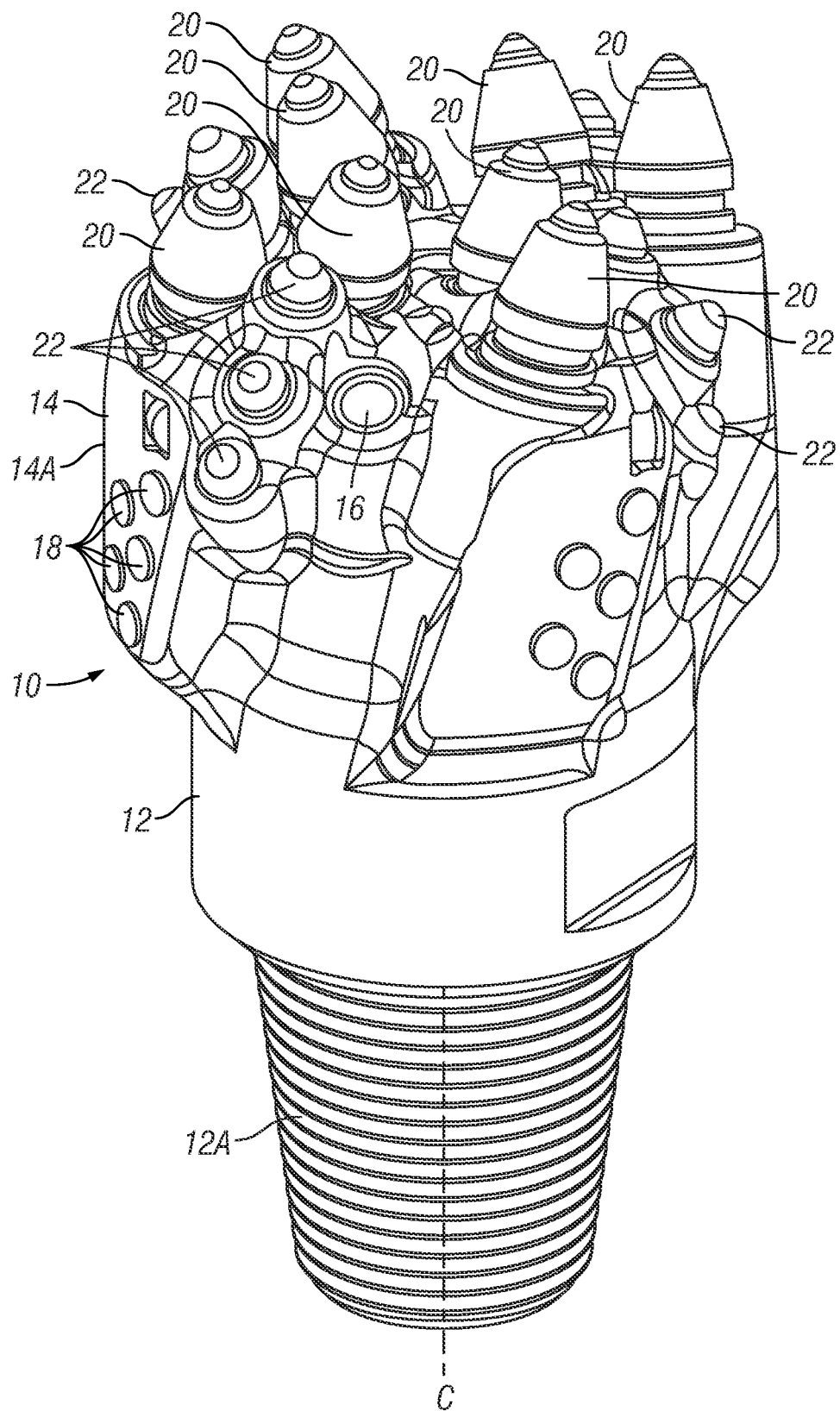
FIG. 1 shows an oblique view of an example embodiment of a drill but according to the present disclosure

FIG. 1 shows an oblique view of an example embodiment of a drill bit 10 according to the present disclosure. The drill bit 10 may comprise a bit body 12 made from any material known in the art to be used for, and having a structure known in the art to be used for fixed cutter drill bits. The bit body 12 may comprise a threaded coupling 12A of any type known in the art, for example, tapered drill pipe threads formed into one longitudinal end of the bit body 12. The bit body 12 may comprise one or more blades 14 to provide mounting structures for one or more cutters (e.g., at 20 and 22 and as explained in more detail below) which may extend generally radially outwardly for a selected distance from a center of rotation C of the bit body 12 to a gage portion 14A of each blade 14. The gage portion 14A in some embodiments may include gage inserts 18 made, for example, from a hard or superhard material such as polycrystalline diamond, cubic boron nitride, diamond impregnated tungsten carbide, tungsten carbide or other metal carbide. The bit body 12 may comprise nozzles, jets or water courses 16 to enable flow of drilling fluid through the bit body 12 and into a wellbore drilled by the drill bit 10. Drilling using the bit 10 shown in FIG. 1 may be conventional, such as by rotating the bit 10 and applying axial force to the bit, while moving fluid such as drilling mud through the nozzles, courses or jets 16.

The bit body 12 may have gouging cutters mounted thereto at selected radial positions with respect to the center of rotation CR and at selected longitudinal positions with respect to a plane normal to the center of rotation CR. The gouging cutters may comprise rotatably mounted cutters 20 (rotatable cutters) and rotationally fixed mounted cutters 22 (non-rotatable cutters). The rotatable cutters 20 may be mounted to the bit body 12, for example, as described in U.S. Pat. No. 10,107,041 issued to Herman et al. and incorporated herein by reference. Such mounting may comprise a snap ring seated in a corresponding groove in the bit body, or similar locking feature that enables the rotatable cutter 20 to remain in place on the bit body 12 while rotating freely in response to applied forces. The non-rotatable cutters 22 may be affixed to the bit body 12, for example, by brazing or any other method used to attach fixed cutters to a bit body. Such methods are well known for attaching shear cutters to a bit body, also as described in the Herman et al. '041 patent.

Some embodiments of the non-rotatable cutters 22 may comprise a generally conically shaped cutting end and a generally cylindrically shaped cutter body made from the same material, e.g., metal carbide such as tungsten carbide, metal carbide coated steel, polycrystalline diamond coated steel or any other material known to be used for gouging cutters. The rotatable cutters 20 may be similarly structured, or may comprise a separate cutter body which may taper toward a separate or integral cutter tip. The cutter tip may be substantially ballistically or conically shaped and made from a hard or superhard material, e.g., metal carbide such as tungsten carbide, diamond impregnated metal carbide, cubic boron nitride, polycrystalline diamond or other hard or superhard material. See, for example, the Beaton et al. '041 patent referred to above for examples of such materials as may be used in some embodiments.

Figure 2:
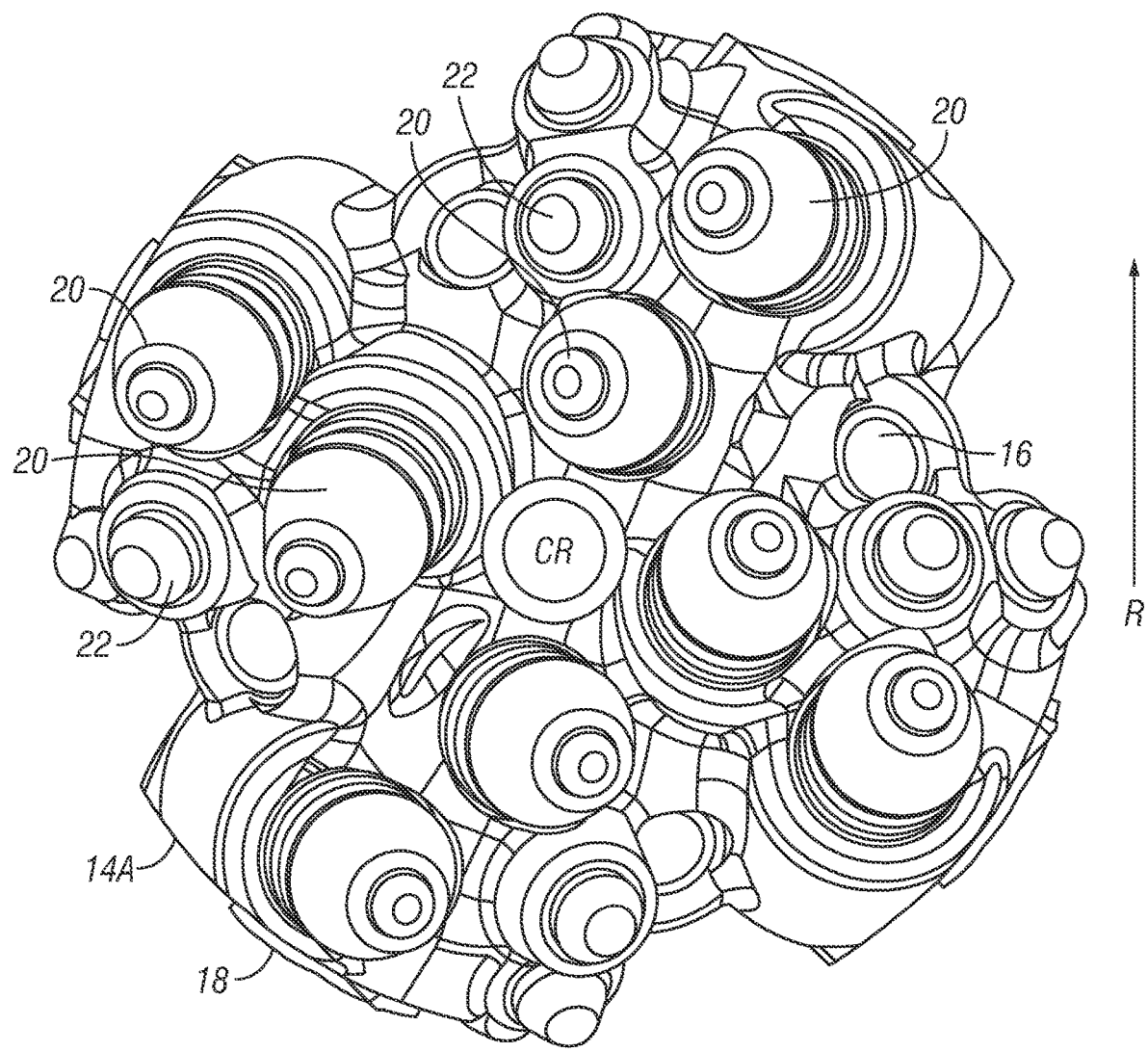
FIG. 2 shows a top view of the example embodiment of a drill bit shown in FIG. 1.

FIG. 2 shows an end view of the example embodiment drill bit explained with reference to FIG. 1. The relative positions of the various rotatable cutters 20, non-rotatable cutters 22 and gage inserts 18 may be observed with reference to the center of rotation CR shown in the figure.

Figure 3:
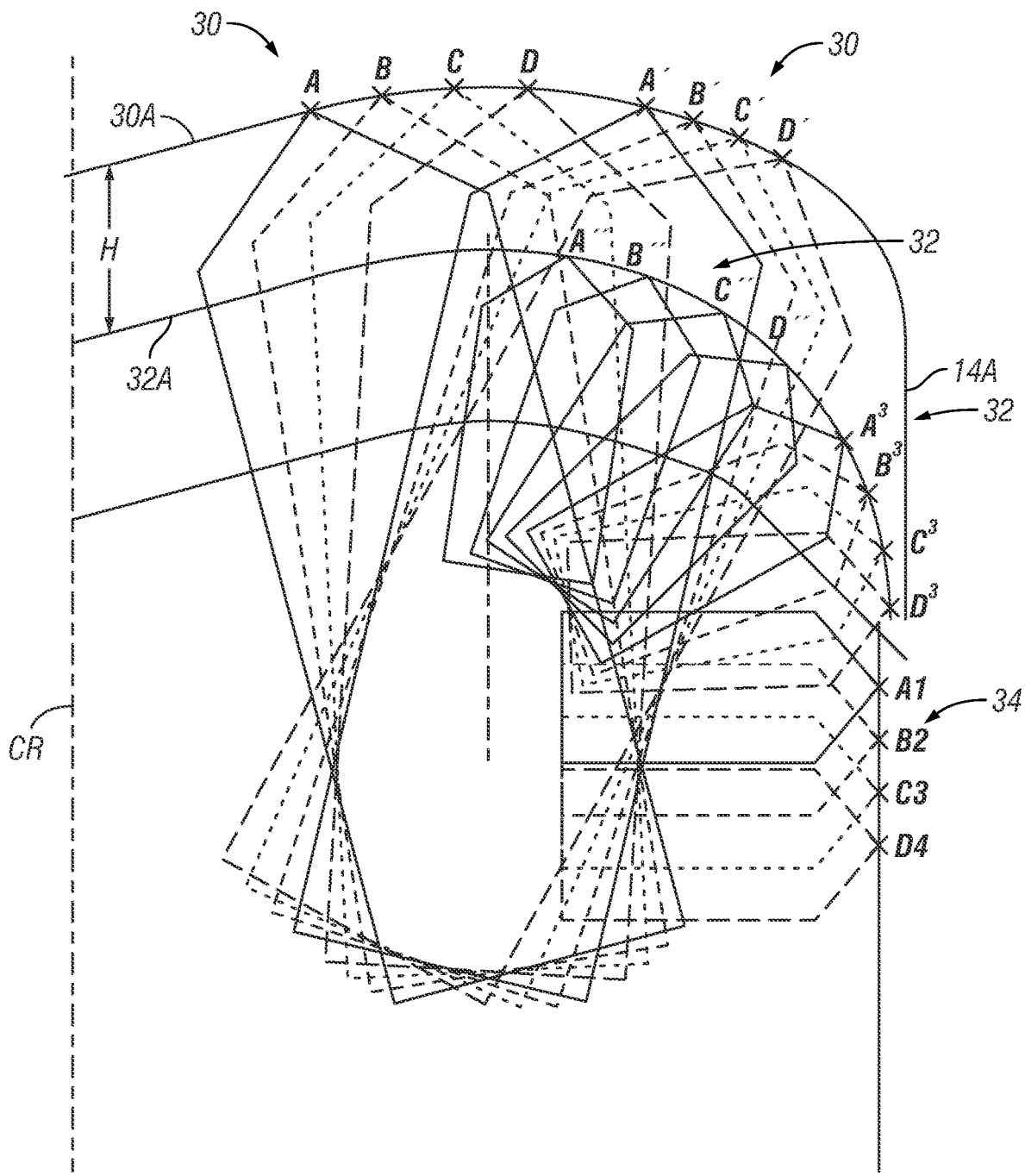
FIG. 3 shows a sectional view of cutter profiles defined by cutters on the drill bit of FIGS. 1 and 2 wherein the profiles are rotated to a common plane.

Referring to FIG. 3, an arrangement of rotatable cutters 20 and non-rotatable cutters 22 according to the present disclosure may provide a drill bit with certain advantageous features and performance. The view in FIG. 3 represents each cutter on the drill bit displayed in a common plane beginning at the center of rotation CR and ending at the gage surface 14. Thus the display in FIG. 3 represents cross-sections of the drill bit through the center of rotation CR and each cutter 20, 22, wherein all the cross-sections are rotated into a common plane.

The rotatable cutters 20 are shown positioned at distances A, B, C, D and A', B', C', D" from the center of rotation CR and define a first profile 30 having a first profile surface 30A. The non-rotatable cutters 22 are mounted to the bit body at distances A", B", C", D" and $A^3$, $B^3$, $C^3$, $D^3$ from the center of rotation CR. The non-rotatable cutters 22 define a second profile 32 having a second profile surface 32A. Gage insert positions are shown in FIG. 3 at A1, B2, C3, D4.

In the present example embodiment, the first profile surface 30A may be disposed at a selected distance H longitudinally ahead of the second profile surface 32A. That is, the first profile surface 30A is extended in the direction in which the drill bit drills formations, in a plane normal to the center of rotation CR. In some embodiments, the selected distance H may be the same at all radial positions from the center of rotation CR to any particular position outward to the gage surface 34.

Figure 4:
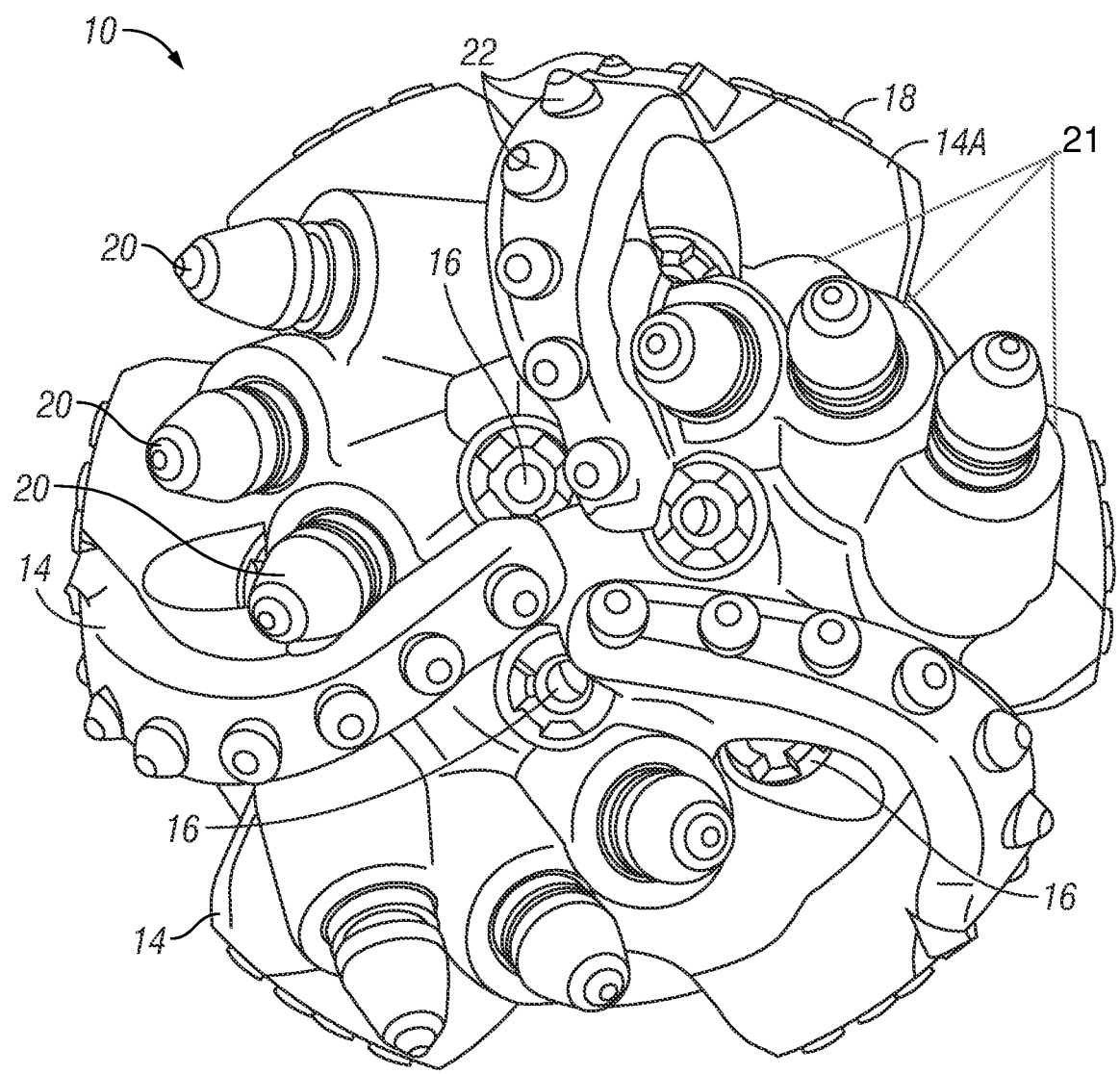
FIG. 4 shows a top view of another example embodiment of a drill bit according to the present disclosure.
Figure 5:
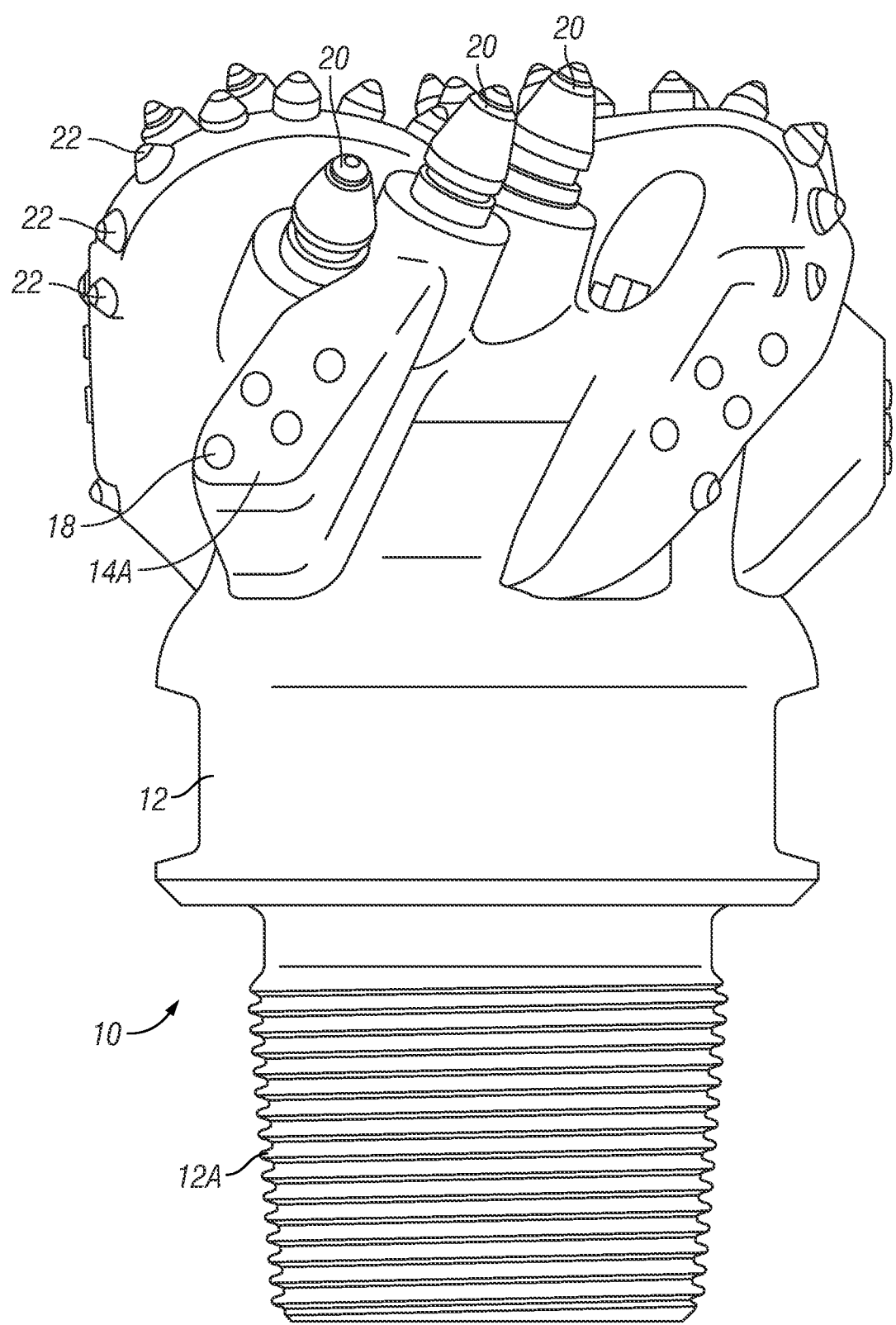
FIG. 5 shows a side view of the embodiment shown in FIG. 4.
Figure 6:
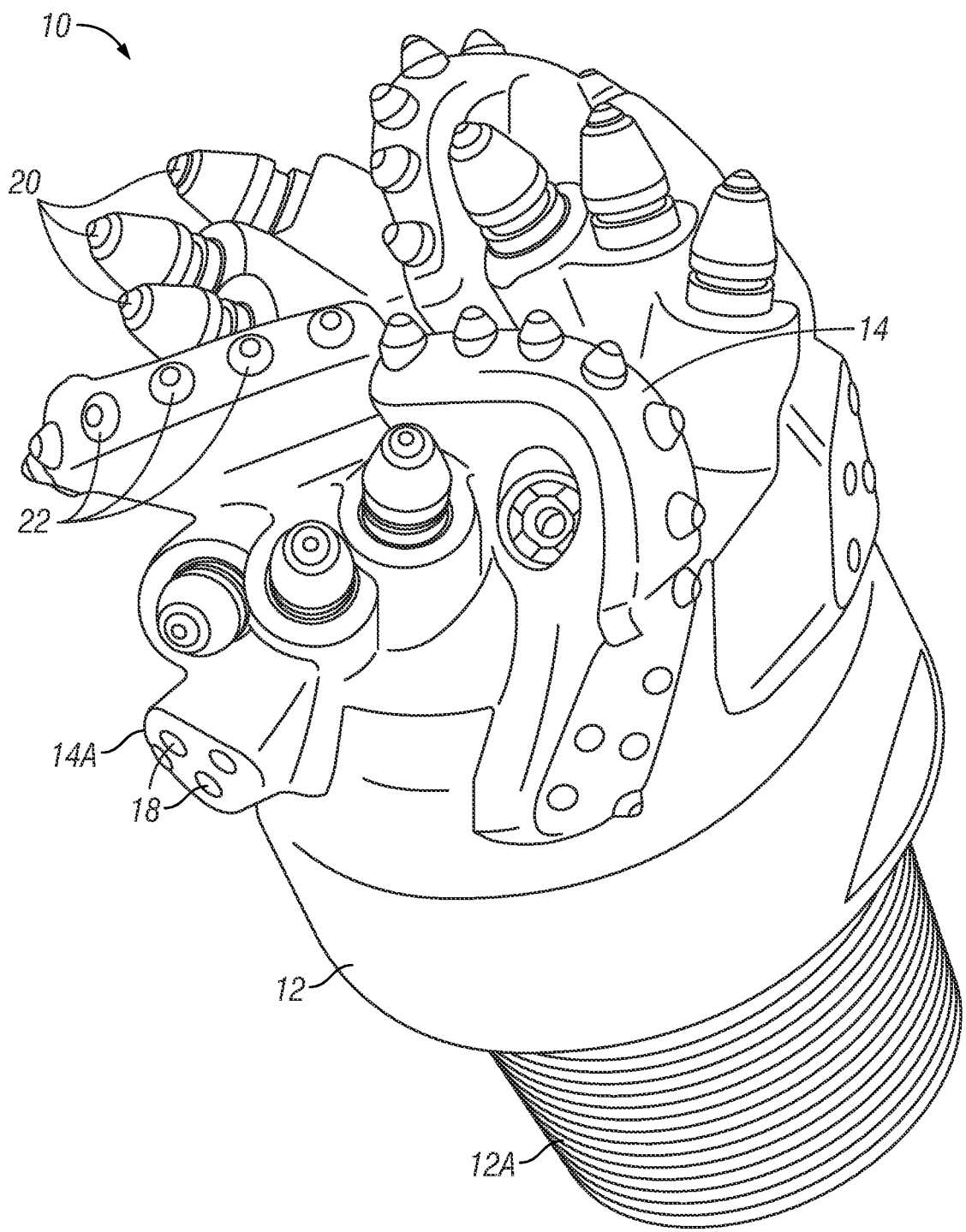
FIG. 6 shows an oblique view of the embodiment shown in FIG. 4.

FIG. 4 shows a top view of another example embodiment of a drill bit according to the present disclosure. FIG. 5 shows a side view of the embodiment shown in FIG. 4. FIG. 6 shows an oblique view of the embodiment shown in FIG. 4. In the present example embodiment, the same features may be present as in the embodiment explained with reference to FIGS. 1, 2 and 3. A bit body 12 may comprise a connecting feature 12A. Blades 14 which extend from a position close to the center of rotation may extend outward to a gage surface 14A. The gage surface 14A may comprise one or more gage inserts 18 similar to those explained with reference to FIGS. 1 and 3. Rotatably mounted gouging cutters 20 may be disposed in corresponding posts 20A in the bit body 12, and non-rotatably mounted gouging cutters 22 may be mounted in suitable receptacles on one or more of the blades 14. One or more jets, nozzles or water courses 16 may be provided as explained with reference to FIGS. 1 and 2. Cutting profiles may be defined, respectively, by the rotatably mounted gouging cutters 20 and non-rotatably mounted cutters 22 as explained with reference to FIG. 3, and mounting of the respective cutters to obtain such profiles may be observed in FIG. 6.

A drill bit made according to the present disclosure may provide increased drilling rate performance and longer drill bit life when drilling certain formations. Such formations may comprise shallow, coarse grained formations that may be associated with bedrock depth changing throughout a geologic field.

Although only a few examples have been described in detail above, those skilled in the art will readily appreciate that many modifications are possible in the examples. Accordingly, all such modifications are intended to be included within the scope of this disclosure as defined in the following claims.

What is claimed is:
1. A drill bit, comprising:
a bit body;
a first plurality of gouging cutters mounted to the bit body on respective posts in the bit body so as to define a first profile;
a second plurality of gouging cutters mounted to the bit body on blades formed in the bit body so as to define a second profile, the first and the second plurality of gouging cutters being substantially conically shaped; and
wherein the first profile is longitudinally ahead of the second profile in a direction of drilling of the drill bit by a selected distance, and wherein the first profile and the second profile have a same center of rotation.
2. The drill bit of claim 1 wherein the selected distance is constant at corresponding radial positions from the center of rotation outward to a gage surface.
3. The drill bit of claim 2 further comprising a plurality of gage inserts coupled to the bit body on gage surfaces defined by the bit body.

4. The drill bit of claim 1 wherein the bit body comprises steel.

5. The drill bit of claim 1 wherein the first plurality of gouging cutters is rotatably mounted to the bit body and comprises metal carbide cutters.

6. The drill bit of claim 5 wherein the metal carbide comprises tungsten carbide.

7. The drill bit of claim 1 wherein the second plurality of gouging cutters is non-rotatably mounted to the bit body and comprises metal carbide cutters.

8. The drill bit of claim 7 wherein the metal carbide comprises tungsten carbide.

9. The drill bit of claim 1 wherein the first plurality of gouging cutters is rotatably mounted to the bit body and comprises polycrystalline diamond.

10. The drill bit of claim 1 wherein the second plurality of gouging cutters is non-rotatably mounted to the bit body and comprises polycrystalline diamond.

11. A drill bit, comprising:
a bit body;
a plurality of substantially conically shaped gouging cutters rotatably mounted to the bit body so as to define a first profile;
a plurality of substantially conically shaped gouging cutters non-rotatably mounted to the bit body so as to define a second profile, the rotatably mounted gouging cutters and the non-rotatably mounted gouging cutters being mounted directly to the bit body; and
wherein the first profile is longitudinally ahead of the second profile in a direction of drilling of the drill bit by a selected distance.

12. The drill bit of claim 11 wherein the selected distance is constant.

13. The drill bit of claim 12 further comprising a plurality of gage inserts coupled to the bit body on gage surfaces defined by the bit body.

14. The drill bit of claim 11 wherein the bit body comprises steel.

15. The drill bit of claim 11 wherein the plurality of rotatably mounted gouging cutters comprises metal carbide cutters.

16. The drill bit of claim 15 wherein the metal carbide comprises tungsten carbide.

17. The drill bit of claim 11 wherein the plurality of non-rotatably mounted gouging cutters comprises metal carbide cutters.

18. The drill bit of claim 17 wherein the metal carbide comprises tungsten carbide.

19. The drill bit of claim 11 wherein the plurality of rotatably mounted gouging cutters comprises polycrystalline diamond.

20. The drill bit of claim 11 wherein the plurality of non-rotatably mounted gouging cutters comprises polycrystalline diamond.

21. A drill bit, comprising:
a bit body;
a first plurality of gouging cutters mounted to the bit body so as to define a first profile, each of the first plurality of gouging cutters each mounted to the bit body on a respective post on the bit body;
a second plurality of gouging cutters mounted to the bit body so as to define a second profile, the first and the second plurality of gouging cutters being substantially conically shaped; and
wherein the first profile is longitudinally ahead of the second profile by a selected distance in a direction of drilling of the drill bit.

22. The drill bit of claim 21 wherein the first profile and the second profile have a same center of rotation.

23. The drill bit of claim 21 wherein the selected distance is constant at corresponding radial positions from the center of rotation outward to a gage surface.

24. The drill bit of claim 21 wherein the gouging cutters in the first plurality are rotatably mounted to the respective posts.

25. The drill bit of claim 21 wherein the gouging cutters in the second plurality are fixedly mounted to a blade on the bit body.

26. The drill bit of claim 21 wherein the first plurality of gouging cutters comprises metal carbide cutters.

27. The drill bit of claim 21 wherein the second plurality of gouging cutters comprises metal carbide cutters.

28. The drill bit of claim 21 wherein the first plurality of gouging cutters comprises polycrystalline diamond.

29. The drill bit of claim 21 wherein the second plurality of gouging cutters comprises polycrystalline diamond.

* * * * *